(12) United States Patent
Stenzel et al.

(10) Patent No.: US 6,370,017 B1
(45) Date of Patent: Apr. 9, 2002

(54) ELECTRODE, AND CAPACITOR WITH THE ELECTRODE

(75) Inventors: Melanie Stenzel, Demmingen; Holger Zillgen, Nattheim, both of (DE); Janos Giber, Budapest (HU)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/724,582

(22) Filed: Nov. 28, 2000

(30) Foreign Application Priority Data

Sep. 8, 2000 (DE) .......................................... 100 44 451

(51) Int. Cl.[7] ................................................. H01G 4/06
(52) U.S. Cl. ........................ 361/524; 361/528; 361/529
(58) Field of Search ................................ 361/508, 509, 361/517, 311, 312, 524, 528, 529, 532

(56) References Cited

U.S. PATENT DOCUMENTS

| | | | |
|---|---|---|---|
| 3,308,350 A | * | 3/1967 | Smyth et al. |
| 3,732,470 A | * | 5/1973 | Robinson ..................... 361/523 |
| 4,130,694 A | * | 12/1978 | Glass et al. ................. 429/193 |
| 4,814,946 A | * | 3/1989 | Su ............................. 361/523 |

FOREIGN PATENT DOCUMENTS

DE  44 08 579 A1  9/1995

\* cited by examiner

*Primary Examiner*—Anthony Dinkins
(74) *Attorney, Agent, or Firm*—Bell, Boyd & Lloyd LLC

(57) ABSTRACT

An electrode for a capacitor having an electrode charge eliminator and an electrode body which is contacted with the electrode charge eliminator and on whose surface a dielectric layer is formed. An intermediate layer blocking the exchange of matter between the dielectric layer and the electrode body is formed between the electrode body and the dielectric layer. The diffusion of oxygen from the dielectric layer into the electrode body is prevented with the aid of the intermediate layer, in particular, so that the electrode exhibits a higher long-time stability.

14 Claims, 1 Drawing Sheet

ELECTRODE, AND CAPACITOR WITH THE ELECTRODE

BACKGROUND OF THE INVENTION

1. Field of the Invention

The present invention relates to an electrode for a capacitor having an electrode charge eliminator and an electrode body which is contacted with the electrode charge eliminator and on whose surface a dielectric layer is arranged. The present invention further relates to a capacitor having such an electrode.

2. Description of the Prior Art

Electrodes for capacitors are known, wherein the electrode body is a porous sintered compact composed of niobium and wherein the dielectric layer is a layer composed of niobium $Nb_2O_5$ produced by anodic oxidation of the porous sintered compact. Basically, such electrodes can be used as anodes for electrolyte capacitors wherein the pores of the sintered compact are filled with a cathode material, which is contacted with a cathode charge eliminator.

The known electrodes have the disadvantage that the dielectric layer does not have a sufficient long-time stability, since the oxygen can diffuse from the dielectric layer into the electrode body. Suboxides such as the semiconducting $NbO_2$ or, respectively, the metallically conducting NbO are formed in the dielectric as a result of the oxygen output. This makes the dielectric effectively thinner so that electric strength is lost and the capacitor fails.

Therefore, the present invention is directed to providing an electrode for capacitors which exhibits a high long-time stability.

SUMMARY OF THE INVENTION

Accordingly, the present invention proposes an electrode for a capacitor, with an electrode charge eliminator and with an electrode body which is contacted with the electrode charge eliminator, and on whose surface a dielectric layer is arranged. An intermediate layer blocking the exchange of matter between the dielectric layer and the electrode body is arranged between the electrode body and the dielectric layer.

Moreover, the present invention proposes a capacitor with an inventive electrode, wherein the capacitor includes a counter electrode such that the dielectric layer is arranged between the intermediate layer and the counter electrode.

Furthermore, the present invention proposes a capacitor, wherein the surfaces of the pores of the electrode are covered with a counter electrode and wherein the counter electrode is contacted with a counter electrode charge eliminator.

The inventive electrode has the advantage that material changes of the dielectric layer or of the electrode body can be effectively blocked due to the intermediate layer. As a result, the stability of the electrode body or, respectively, of the dielectric layer improves, and the electrode, or the capacitor produced by it, exhibits an improved long-time stability.

The present invention can be advantageously utilized for an electrode whose electrode body is a porous body. Porous bodies are characterized by a large surface, so that capacitors having large capacities can be created when the surfaces of the pores, corresponding to the inventive capacitor, are covered with a counter electrode.

The porous electrode body can be produced by sintering a powder or a paste, for example. The sintering of a green compact of powder containing tantalum or niobium or, respectively, of a correspondingly suitable paste is particularly considered.

The dielectric layer of the electrode can be produced, for example, by oxidizing a surface layer of a body whose non-oxidized residue forms the electrode body. In this case, it is particularly advantageous when the dielectric layer is selected such that it impairs the diffusion of oxygen. As a result, the diffusion of oxygen from the dielectric layer into the electrode body can be blocked, so that the change of the dielectric layer, which progresses in the course of time due to the loss of oxygen, can be effectively reduced.

Such an intermediate layer, which blocks the diffusion of oxygen, can be an intermediate layer containing scandium, yttrium, a lanthanide, titan, zircon, vanadium, chrome or molybdenum. Lanthanide, lanthanum, cerium, praseodymium, neodymium, polonium, samarium, europium, gadolinium, terbium, dysprosium, holmium, erbium, ytterbium, thulium or lutetium also can be taken into consideration. As a result of the low diffusion rate of oxygen, all these materials are well suited as a diffusion barrier for oxygen.

In the case of the electrode body including niobium and the dielectric layer including $Nb_2O_5$, it is particularly advantageous to utilize an intermediate layer that includes vanadium, as experiments have shown.

The thickness of the intermediate layer should thereby have at least two atomic monolayers. Thicker intermediate layers, however, are also conceivable.

The inventive electrode can be advantageously produced from a material including a component A and a component B, wherein the surface energy of the component B is less than the surface energy of the component A, and wherein the intermediate layer includes a part of the component B segregated from the starting material. The component B thereby can be present in the form of a dopant of the material.

Since the intermediate layer is produced by segregation of a component B, its production is particularly simple and occurs without further outlay, since the intermediate layer can be automatically produced at the inventively appropriate location; namely, at the surface of the electrode body. As a material, a metallic alloy, wherein the portion of the component B typically is between 10 and 50 weight per cent—ppm, can be particularly considered.

A metallic alloy has the advantage that the electrode body produced by it simultaneously exhibits the electrically conducing properties required for a capacitor. It is particularly advantageous when the component A of the alloy is a valve metal that is suitable for forming a dielectric or when the component A is an alloy containing such a valve metal. Valve metals exhibit the property of being capable of forming a suitable dielectric layer by oxidization. For example, tantalum or niobium can be used as valve metal. As a valve-metalliferous alloy, a tantalum/niobium alloy, for example, can be used which also forms a corresponding mixed oxide exhibiting advantageous properties when the dielectric layer is formed by oxidization. In these cases, the component B can be respectively one of the aforementioned individual metals, for example vanadium, or can be a combination thereof.

Furthermore, it is advantageous when the electrode body is produced from an alloy containing niobium or vanadium, since an intermediate layer composed of segregated vanadium can be simply formed due to the different surface energies of niobium ($\gamma=2.983$ $Jm^{-2}$) and vanadium ($\gamma=2.876$ $Jm^{-2}$). The segregation of the vanadium to the surface of the niobium, for example, can occur via a correspondingly suitable heat treatment, subsequent to the oxidization of the electrode body.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
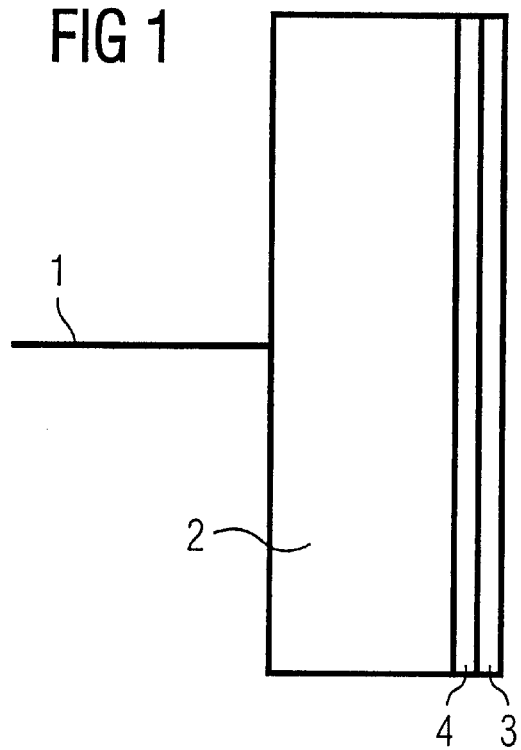
FIG. 1 shows a schematic cross-sectional view of an exemplary electrode of the present invention.

FIG. 1 shows an electrode with an electrode body 2, which is connected to an electrode charge eliminator 1 in an electrically-conducting manner. A dielectric layer 3 is arranged on the surface of the electrode body 2. An intermediate layer 4 is arranged between the electrode body 2 and the dielectric layer 3.

Figure 2:
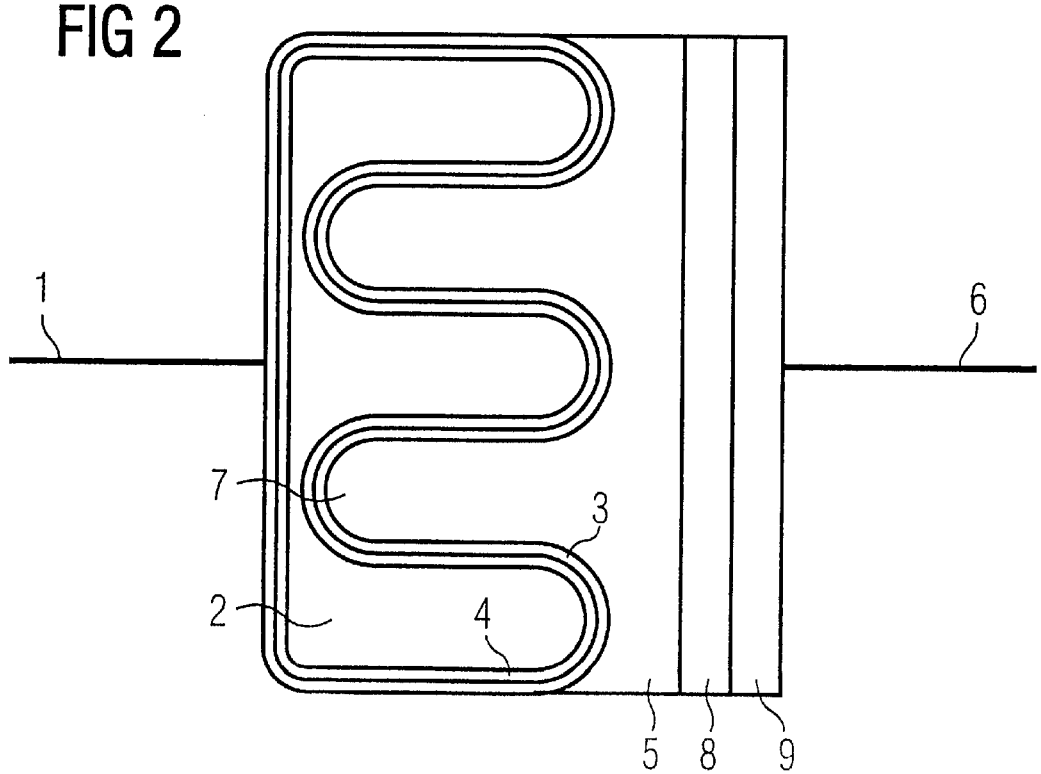
FIG. 2 shows a schematic cross-sectional view of an electrolytic capacitor having the inventive electrode as its anode.

FIG. 2 shows an electrolytic capacitor with the inventive electrode as its anode, wherein the electrode corresponds to the basic structure of FIG. 1 and wherein the electrolytic body 2 of the electrode is a porous body with pores 7. The electrode body 2 preferably includes a valve metal such as tantalum or niobium, wherein a dielectric oxide can be produced therefrom by anodic oxidation.

The electrode body 2 preferably is produced from an alloy of niobium and vanadium in the form of a powder. An electrode charge eliminator 1 in the form of either a metal wire or a planar, metallic charge eliminator is formed thereby. For example, a tantalum-containing wire or a niobium-containing wire or a planar charge eliminator made of a corresponding material is covered by the powder and is subsequently sintered together with it. A porous electrode body 2 that is connected to the electrode charge eliminator 1 results therefrom. The portion of the vanadium with respect to the alloy thereby can be, typically, between 10 and 50 weight per cent—ppm. Alternatively, the electrode also can be produced with the aid of a paste which is deposited on the electrode charge eliminator 1 by an appropriate method, such as silk-screen, and which is subsequently sintered.

In a further process step, a dielectric layer of $Nb_2O_5$ can be formed on the surface of the electrode body 2 by anodic oxidization. This layer forms the dielectric layer 3. An electrode composed of niobium is characterized by a high specific charge and by a relative permittivity of the formed dielectric. The aforementioned process step is known to someone skilled in the art as forming and can be carried out, for example, by means of an electrode body 2 immersing into an electrolyte with a phosphoric acidity between typically 0.1 and 5% given a temperature between typically 30 and 85° C. A forming voltage between preferably 10 and 80 V is applied between the electrode charge eliminator 1 and the counter electrode utilized during the forming.

In a further manufacturing step, a part of the vanadium segregates from the alloy to the surface of the electrode body 2 and forms an intermediate layer 4 between the dielectric layer 3 and the electrode body 2 after the oxide has formed through a heat treatment between 250 and 450° C. for a period of time of 0.5 to 3 hours. The segregation is possible due to different surface energies of vanadium and niobium.

The intermediate layer 4 is composed of vanadium, which potentially can still contain impurities. A property of vanadium is that it does not dissolve oxygen as well such that it cannot be diffused as well compared to niobium. Therefore, it is a suitable diffusion barrier for the oxygen outputted in the dielectric layer 3, which is composed of $Nb_2O_5$; otherwise, the oxygen would diffuse into the niobium electrode body 2. The oxide layer, in the course of time, would be transformed into suboxides as a result of this oxygen loss. The inventive electrode produced as such can be completed to a capacitor in a way that is known per se.

The pores 7 of the electrode are filled with a counter electrode material 5, such as $MnO_2$ or a conductive polymer. In further process steps, contact layers 8, 9 are produced which are finally connected to a counter electrode charge eliminator 6. The first contact layer 8 can be manufactured from graphite and the second contact layer 9 can be manufactured from silver conductive lacquer, for example.

Although the present invention has been described with reference to specific embodiments, those of skill in the art will recognize that changes may be made thereto without departing from the spirit and scope of the invention as set forth in the hereafter appended claims.

We claim as our invention:

1. An electrode for a capacitor, comprising:
   an electrode charge eliminator;
   an electrode body contacted with the electrode charge eliminator;
   a dielectric layer formed on a surface of the electrode body; and
   an intermediate layer formed between the electrode body and the dielectric layer, the intermediate layer blocking an exchange of matter between the dielectric layer and the electrode body.

2. An electrode for a capacitor as claimed in claim 1, wherein the electrode body is a porous body.

3. An electrode for a capacitor as claimed in claim 1, wherein the electrode body is formed from one of a sintered powder and a sintered paste.

4. An electrode for a capacitor as claimed in claim 1, further comprising:
   an initial body, wherein the dielectric layer is formed by oxidizing a surface layer of the initial body and the electrode body is formed from non-oxidized residue of the initial body, and wherein the intermediate layer blocks diffusion of oxygen between the dielectric layer and the electrode body.

5. An electrode for a capacitor as claimed in claim 1, wherein the intermediate layer contains at least one of scandium, yttrium, a lanthanide, titan, zircon, vanadium, chrome or molybdenum.

6. An electrode for a capacitor as claimed in claim 1, wherein the dielectric layer includes $Nb_2O_5$, the electrode body includes niobium, and the intermediate layer includes vanadium.

7. An electrode for a capacitor as claimed in claim 1, wherein the intermediate layer has a thickness of at least two atomic monolayers.

8. An electrode for a capacitor as claimed in claim 1, further comprising:
   a material including a component A and a component B from which the electrode body is formed, wherein a surface energy of the component B is less than a surface energy of the component A, and the intermediate layer includes a part of the component B segregated from the material.

9. An electrode for a capacitor as claimed in claim 8, wherein the material is a metallic alloy and a portion of the component B with respect to the alloy is between 10 and 50 weight per cent—ppm.

10. An electrode for a capacitor as claimed in claim 9, wherein the component A is one of a valve metal and a valve-metalliferous alloy, and the component B is a metal.

11. An electrode for a capacitor as claimed in claim 1, further comprising:

an alloy containing niobium and vanadium from which the electrode body is formed, and wherein the intermediate layer contains segregated vanadium.

12. An electrode for a capacitor as claimed in claim 8, wherein the component B is a dopant in the material of the electrode body.

13. A capacitor, comprising:

an electrode which includes an electrode charge eliminator, an electrode body contacted with the electrode charge eliminator, a dielectric layer formed on a surface of the electrode body, and an intermediate layer formed between the electrode body and the dielectric layer wherein the intermediate layer blocks an exchange of matter between the dielectric layer and the electrode body; and a counter electrode, wherein the dielectric layer is formed between the intermediate layer and the counter electrode.

14. A capacitor as claimed in claim 13, further comprising:

a counter electrode charge eliminator contacted with the counter electrode, wherein the electrode has a porous body with pores, and surfaces of the pores are covered with the counter electrode.

* * * * *